United States Patent [19]

Tulpule et al.

[11] Patent Number: 5,128,943
[45] Date of Patent: Jul. 7, 1992

[54] INDEPENDENT BACKUP MODE TRANSFER AND MECHANISM FOR DIGITAL CONTROL COMPUTERS

[75] Inventors: Bhalchandra R. Tulpule, Vernon; Edward M. Oscarson, Bristol, both of Conn.

[73] Assignee: United Technologies Corporation, Hartford, Conn.

[21] Appl. No.: 346,247

[22] Filed: Apr. 5, 1989

Related U.S. Application Data

[63] Continuation of Ser. No. 922,617, Oct. 24, 1986, abandoned.

[51] Int. Cl.⁵ .......................................... G06F 11/20
[52] U.S. Cl. .................................. 371/9.1; 395/575; 364/DIG. 2; 364/944.2; 364/944; 364/945
[58] Field of Search ... 364/200 MS File, 900 MS File; 371/9.1, 10

[56] References Cited

U.S. PATENT DOCUMENTS

| | | | |
|---|---|---|---|
| 4,070,704 | 1/1978 | Calle et al. | 364/200 |
| 4,141,066 | 2/1979 | Keiles | 364/119 |
| 4,150,428 | 4/1979 | Inrig et al. | 364/200 |
| 4,394,763 | 7/1983 | Nagano et al. | 371/38 |
| 4,458,307 | 7/1984 | McAnlis et al. | 364/200 |
| 4,521,847 | 6/1985 | Ziehm et al. | 364/184 |
| 4,648,031 | 3/1987 | Jenner | 364/900 |
| 4,654,819 | 3/1987 | Stiffler et al. | 364/900 |
| 4,697,266 | 9/1987 | Finley | 374/12 |
| 4,823,256 | 4/1989 | Bishop et al. | 364/200 |

FOREIGN PATENT DOCUMENTS

| | | |
|---|---|---|
| 0096510 | 12/1983 | European Pat. Off. |
| 0211500 | 2/1987 | European Pat. Off. |
| 1560554 | 2/1980 | United Kingdom |
| 2104247 | 6/1985 | United Kingdom |

OTHER PUBLICATIONS

NASA, "Back-up Flight Control for Flight Crucial Digital Fly-By-Wire Systems", Sep. 10, 1982, see entire document.
Deets et al., "Flight Test of a Resident Backup Software System", Jan. 1986 pp. 1–10.
"Fault Tolerance by Design Diversity: Concepts and Experiments" by Avizienis et al, Aug. 1984, IEEE Computer Magazine.

Primary Examiner—Gareth D. Shaw
Assistant Examiner—Kakali Chaki

[57] ABSTRACT

An interrupt is provided to a signal processor having a non-maskable interrupt input, in response to the detection of a request for transfer to backup software. The signal processor provides a transfer signal to a transfer mechanism only after completion of the present machine cycle. Transfer to the backup software is initiated by the transfer mechanism only upon reception of the transfer signal.

5 Claims, 5 Drawing Sheets

INDEPENDENT BACKUP MODE TRANSFER AND MECHANISM FOR DIGITAL CONTROL COMPUTERS

STATEMENT OF GOVERNMENT RIGHTS

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

This is a continuation of application Ser. No. 06/922,617 filed on Oct. 24, 1986 now abandoned.

CROSS REFERENCE TO RELATED APPLICATION

The invention described herein may employ some of the teachings disclosed and claimed in a commonly owned co-pending application filed on Mar. 22, 1985 by Murphy et al, Ser. No. 715,132, entitled "Backup Control System (BUCS)".

1. Technical Field

This invention relates to transfer methods and mechanisms for digital control computers and, more particularly, to methods and mechanisms for transferring between a primary program memory and a backup program memory.

2. Background Art

In recent years, the increasing capabilities of digital microprocessors have led to the realization of redundant high performance digital control computer systems, e.g., for avionic applications. These powerful and reliable systems can perform complex computation and control functions, as well as detect, isolate and reconfigure the system elements with a high degree of reliability in the presence of hardware failures. However, the increasing complexity of the software resident in the systems, has led to the demand for software reliability and fault tolerance. In particular, there has been a strong demand for protection from the so-called generic software failure or error. Redundant digital systems utilizing identical software in all channels are particularly vulnerable to this type of error. This arises if all channels perform the same erroneous activity which cannot be predicted and which can lead to system failure. Therefore, there is a basic need for techniques that can protect the digital control system from generic software failures.

The protection mechanism against generic software failures may take on many forms. For example, analog electronic computers may be used as backups for the primary digital system. An alternate solution involves the use of "in situ" alternate software which is switched on in case of a detected generic software failure. In this case, the alternate software package is responsible for preventing loss of control of the system. This approach is quite cost effective, as the alternate software shares the same channel hardware, except for the program memory.

The alternate software, resident in a backup memory, can be engaged or disengaged by means of a transfer mechanism. Clearly, the reliability of the overall system in the presence of generic common mode software faults is dependent on the reliability and fault tolerance of the transfer mechanism. Therefore, the problem of protection from generic software failures is closely associated with the need for a reliable, independent, fault tolerant backup mode transfer mechanism for digital control computer systems.

DISCLOSURE OF THE INVENTION

An object of the present invention is to provide a transfer mechanism for transferring from primary program memory to an alternate or backup program memory which is independent of the channel's software. In other words, the transfer must occur via a hardware mechanism free of any software control.

Another object of the present invention is to provide a transfer method and mechanism for transferring all channels to and from the backup mode with near simultaneity. It will be understood that this cannot be done by a central transfer controller because of the possibility of a common mode hardware failure.

Another object of the present invention is to provide a transfer mechanism and method that provides clean, transient free transfers, i.e., the process of transfer between the primary and backup program memories must not create transients or leave incompleted routines or apparent failures behind which can lead to loss of the system after the transfer.

Another object of the present invention is to provide a transfer mechanism and method for a redundant system in which unambiguous performance is provided in the presence of a power loss to a subset of channels.

Another object of the present invention is to provide a transfer mechanism method responsive to the detected occurrances of the so-called generic software fault and-/or the occurrance of direct user transfer requests.

According to the present invention, the transfer method and mechanism, when activated, sends a nonmaskable interrupt to all of the channel processor(s) when a majority of channels detect (by means of a sever request, a user request or any other mechanism) a generic software failure; each of the processors then sends an acknowledge signal in response to the non-maskable interrupt after concluding the machine cycle in which it is engaged at the time it receives the interrupt; the acknowledge signal, which is purely a hardware driven signal, is then used to transfer the signal processor's program memory from a primary program memory to a backup program memory.

The method and mechanism of the present invention utilizes the technique of providing a shadow or backup memory for the primary program memory. The program contained in the shadow backup memory will be different from the program in the primary memory in order to provide for protection against a generic software failure in the primary software. A key element of this approach is the use of a non-maskable interrupt which cannot be disabled by software. The transfer is clean and transient free. Once the system is transferred into backup mode it will remain in backup mode unless the operator, e.g., the pilot, disarms the backup system for a transient-free return to primary mode.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
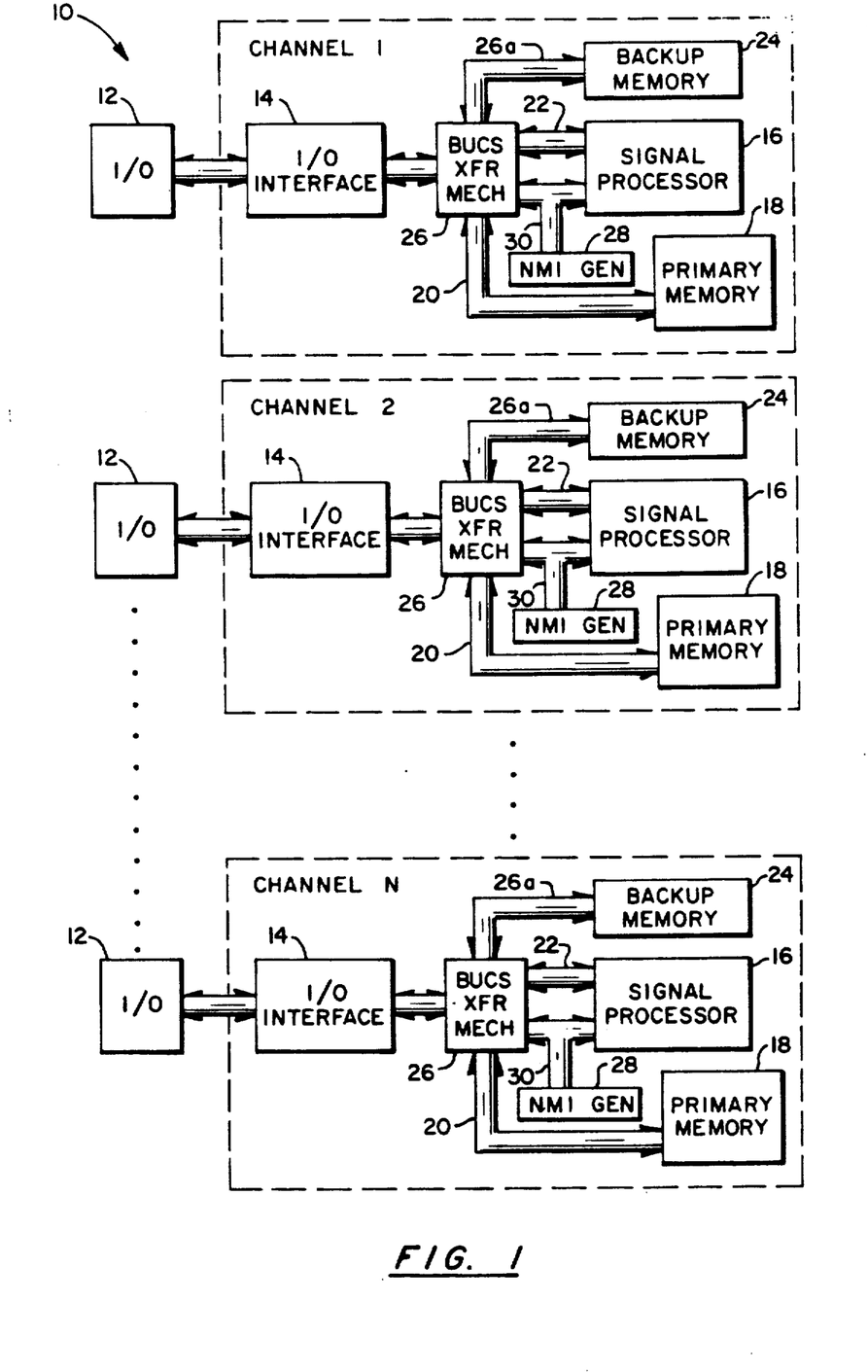
FIG. 1 is an illustration of a redundant digital computer control system in which the present invention is embodied in each channel.

FIG. 1 is an illustration of a redundant channel digital computer control system 10 having several redundant channels employed for system reliability.

Each channel is illustrated generally as having three main components, i.e., input/output (I/O) 12, an I/O Interface 14, and a signal processor 16, typically a microprocessor. Each signal processor 16 in each channel will normally interface with a primary memory space 18 over data, control and address lines 20, 22. According to the method and mechanism of the present invention, a Backup Control System (BUCS) transfer mechanism may be functionally interposed between address and data lines 20 and data and address lines 22 in order to permit the substitution of a backup memory 24 in place of the primary memory 18 in the presence of several conditions including a generic software fault in the primary program memory. In the backup mode, address and data lines 26a and data and address lines 22 are used in lieu of the address and data lines 20, 22. A BUCS Transfer Mechanism 26 is functionally shown within each channel in FIG. 1 as the means whereby the transfer is effected.

A Non-Maskable Interrupt Generator 28 is shown in each channel for providing and receiving various signals over a signal line 30 between the BUCS Transfer Mechanism 26 and the Signal Processor 16.

Figure 2:
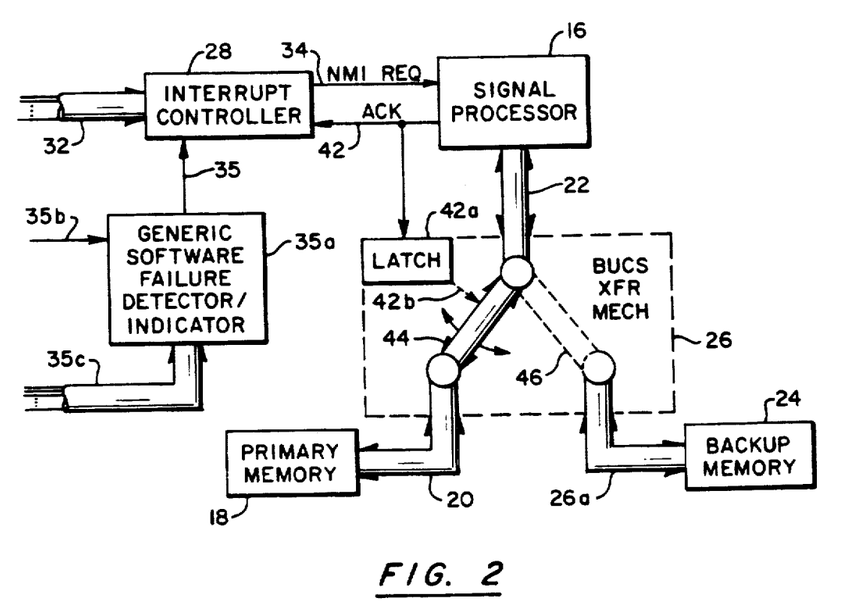
FIG. 2 is a functional illustration of the inventive concept of the present invention.

Referring now to FIG. 2, a channel interrupt controller 28 is shown responsive to several priority interrupt signals on lines 32 for providing the various interrupts to the signal processor 16. These will include a Non-Maskable Interrupt request signal on a line 34 generated in response to the presence of a signal on a line 35 from a generic software failure detector 1 indicator 35a. The detector/indicator 35a may be part of the BUCS Transfer Mechanism 26. The signal on the line 35 will be sent either if a generic software failure is detected or if requested, as indicated by a request signal on a line 35b. A number of channel failure (sever) signals are provided on lines 35c, each indicative of the status of its respective channel. The signal on line 34 will be sent to the processor 16 upon detection of, for example, a generic software failure, among other conditions.

Figure 3:
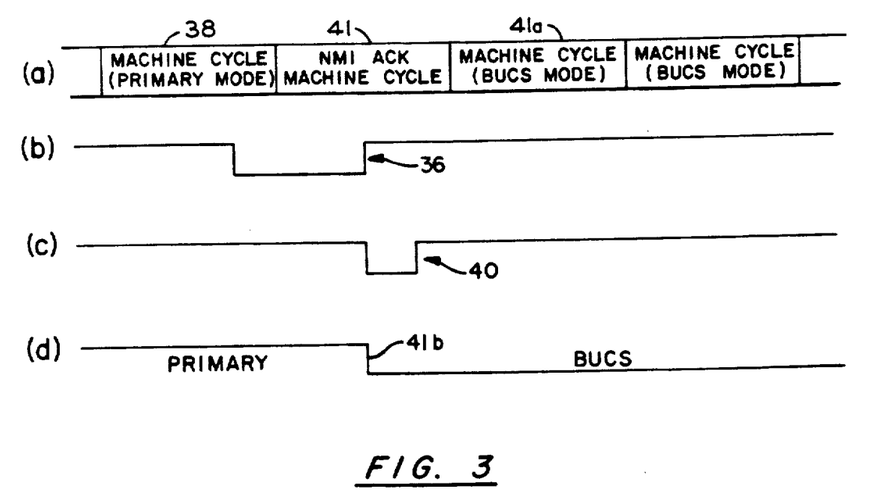
FIGS. 3(a)-3(d) are timing diagrams presented as an aid for understanding the implementation of the transfer mechanism illustrated in FIG. 2.

The signal processor 16 will have a machine cycle which can typically be dynamically varied, e.g., from one clock period to ten clock periods. A series of such machine cycles are shown in FIG. 3(a). In the case illustrated, an NMI request signal is transmitted to the signal processor, as illustrated in FIG. 3(b) by a waveform 36. If an immediate acknowledge is returned by the signal processor 16 to the interrupt controller 28 then the signal processor might be interrupted in the middle of the performance of some vital task such as addressing memory as shown in general by a machine cycle 38 in FIG. 3(a). It is essential for the proper operation of the BUCS Transfer Mechanism 26 of the present invention for the acknowledge signal to be sent only during a period of time in which the Signal Processor 16 is not disturbed in its normal read/write activity. Thus, FIG. 3(c) shows an acknowledge signal waveform 40 corresponding to an acknowledge signal on a line 42 in FIG. 2 as occurring only during a special period of time 41 during which the signal processor is guaranteed to have completed the previous machine cycle 38, so as to avoid interfering with the signal processor's normal read/write activity. FIG. 3(d) shows that the transfer to backup memory is also effected during the NMI ACK machine cycle 41 such that the next succeeding machine cycle 41a accesses the backup memory. A transition 41b indicates a transfer boundary between the signal processor's accessing primary as opposed to backup memory. Referring back to FIG. 2, the actual transfer is initiated by the acknowledge signal on the line 42. The acknowledge signal would normally be input to a state latch 42a which in turn provides a transfer signal on a line 42b to a link 44, which changes its position to that shown by phantom lines 46 in response thereto.

It will be observed that the BUCS Transfer Mechanism 26 is only shown functionally in FIG. 2 so as to aid in understanding the invention. The mechanism is illustrated as a simple single pole double throw switch, which may be break before make, make before break, or any variation thereof. The function, of course, is to respond to the acknowledge signal on line 42 without software intervention to provide a switchover of the signal processor's address/data lines 22 from connection to the primary memory along line 20 to connection to the backup memory along lines 26a. This is effected by changing the position of the "link" 44 from the position shown in FIG. 2 to a second position 46 shown by phantom lines within the mechanism 26, as mentioned above. Of course, this purely functional description is not an accurate description of the actual means by which this would be effected in reality. In a real circuit, the function of the mechanism 26 shown in FIG. 2 would be accomplished simply by the signal processor 16 chip selecting a different memory at the proper time, as taught herein. Thus, it will be understood that FIG. 2 is presented primarily as an aid for understanding the function of the BUCS transfer mechanism.

Figure 4:
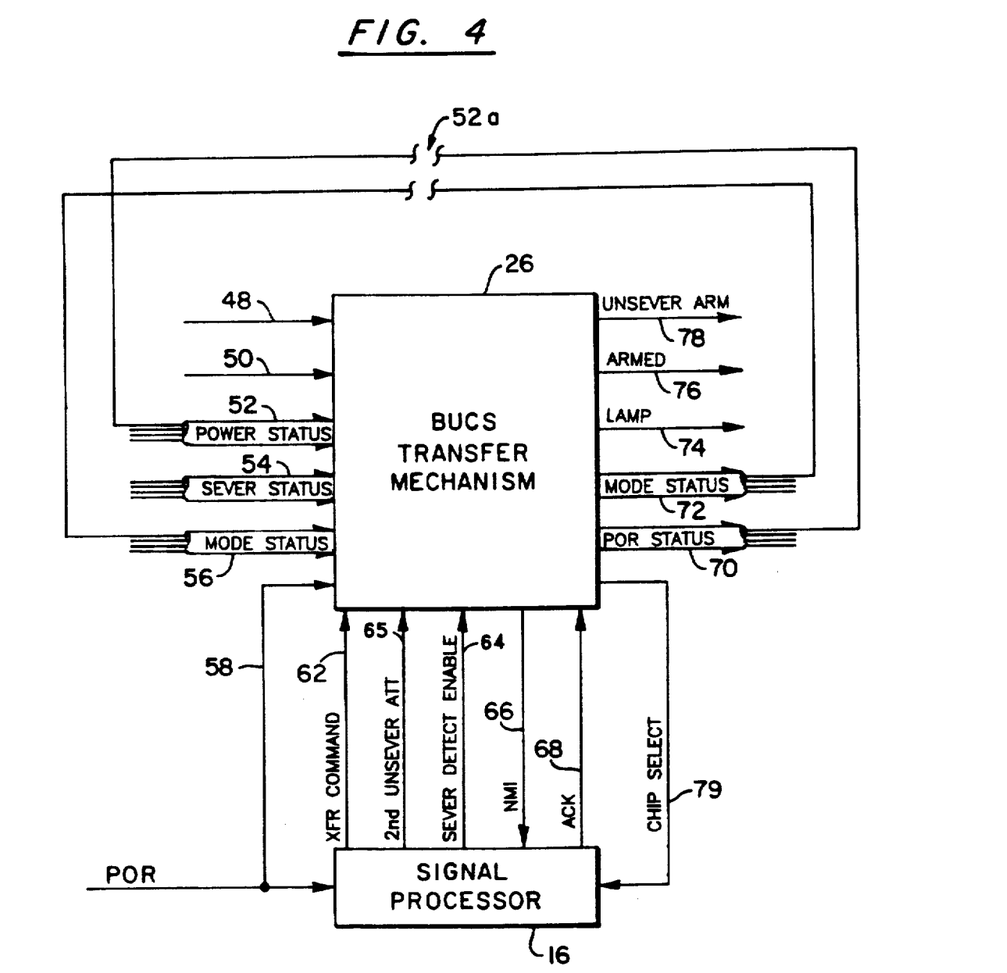
FIG. 4 is an illustration of a hardware implementation of the BUCS Transfer Mechanism, according to the present invention, particularly showing the various input and output signals which may be associated with such a Transfer Mechanism.

Referring now to FIG. 4, a BUCS Transfer Mechanism 26 is shown in a way which better illustrates the signals input thereto and output therefrom and how the BUCS Transfer Mechanism interfaces with the signal processor.

A BUCS Arm signal on a line 48 is provided from, for example, a pilot actuated switch indicating that the pilot wishes the BUCS Transfer Mechanism 26 to be enabled. In the absence of this signal being activiated, a transfer between primary and backup memories will never occur.

A BUCS Engage signal on a line 50 is also provided, for examle, from the pilot to the various channels to perform a transfer regardless of detection of a generic software fault. This signal is provided to the backup transfer mechanism for manual actuation whenever the pilot desires a transfer or perceives the presence of a generic software failure.

The BUCS Transfer Mechanism 26 will also be responsive, in a quad channel system, to a group of four redundant channel power status signals 52 each indicative of the power status of one of the four redundant channels in the quad system. The Transfer Mechanism is designed to always commence channel activity in the primary operating mode upon restoration of power. One of the four signal lines 52 will originate with and be identical to one of four POR status signal lines 70 to be described below. One of the status signals on line 70 is merely routed back into the BUCS Transfer Mechanism via one of the signal lines 52. A break 52a in the signal line 52 is shown from its origination on signal output line 70 in order to indicate that the routing back of the POR status signal to the input may be rather circuitous and may involve routing outside of the channel and also may involve signal conditioning not shown.

the BUCS Transfer Mechanism 26 is also responsive to a group of four sever status signals on a line 54 each indicative of the sever status of one of the four channels in the quad system, including its own channel. If it is determined that a majority of channels are presently severed then a transfer to the BUCS mode will be made, if the channel were operating in the primary mode at the time.

The BUCS Transfer Mechanism 26 is also responsive to a group of four signals on a line 56 each indicative of the mode status of one of the channels in the quad system. If it is determined that a majority of powered channels, as determined by reference to the signals on line 52, are presently in the BUCS mode a channel will be transferred to the BUCS mode if it is presently still in the primary memory mode. It will be observed that one of the mode status signals originates at an output of the BUCS Transfer Mechanism, at a signal line 72, in a manner similar to that already described in connection with one of the signal lines 52. The same comments apply here.

It will also be observed that the plurality of input signals input on input line 54 do not have one of that plurality of signals originating at the output, as with one of the signals in each of the cases corresponding to input signal lines 52 and 56. However, it will be understood that the BUCS Transfer Mechanism 26 could also include the necessary circuitry for originating these signals. However, in the embodiment shown in FIG. 4, they have been located elsewhere (not shown). Thus, it will be understood that although the circuitry for originating the signals on lines 70 and 72 have been included in the BUCS Transfer Mechanism 26 of FIG. 4, they could just as easily be provided elsewhere and not shown in the same manner that the source of signals 54 has not been shown in FIG. 4. These entities are freely transferable in and out of the BUCS Transfer Mechanism and are not an essential part of the present invention.

The BUCS Transfer Mechanism 26 is also responsive to a power-on-reset (POR) signal on a line 58 for indicating that the channel has just been powered up and that the channel should commence activity in the primary operating mode. Hence, the BUCS Transfer Mechanism 26 will ensure that the Primary Memory 18 will be utilized immediately after receiving a POR signal.

The signal processor 16 provides a CPU commanded transfer signal on a line 62 to the transfer mechanism. The function of the signal on line 62 is to provide a CPU initiated transfer for testing, as well as to provide an alternate transfer vehicle controlled by software. A sever detect enable signal on a line 64 is also provided for the purpose of disabling transfer to BUCS after system POR, i.e., to allow initial system operating in primary mode. A signal on a line 65 allows for a second attempt to unsever.

A Non-Maskable Interrupt request signal on a line 66 is provided to the signal processor from the BUCS Transfer Mechanism. The function of this signal is similar to that of the signal on line 34 of FIG. 2 except that it is provided, in FIG. 4, from the BUCS Transfer Mechanism itself rather than from an interrupt controller 28, as in FIG. 2. Functionally, there is no difference. The signal processor 16 sends an acknowledge on a line 68 at the proper moment so as not to interfere with its read/write operations with memory.

A group of four POR status signals on a line 70 are provided, one to each of the channels, including one to itself (see signal line 56), for the purpose of indicating the POR status of this particular channel to each of the other channels.

A group of four channel mode status signals on a line 72 each indicative of the mode status of the particular channel associated with the particular BUCS Transfer Mechanism from which they emerge are also provided to all the channels in the system (one of these signals appears on line 56).

A BUCS Engage lamp signal is provided on a line 74 for energizing an indicator lamp indicative of whether the backup memory is being utilized at a particular point in time or not.

A BUCS Armed lamp signal on a line 76 is provided for energizing a lamp indicative of whether the pilot has armed BUCS.

An Unsever Arm latch signal on a line 78 is provided to rearm an unsever mechanism (not shown) for the purpose of restoring a severed channel's ability to unsever its outputs and commence operation in a new mode. A mode status signal is provided on a line 79 to the signal processor. This signal determines which of two chip select signals is active. Depending on which chip select signal is active, one or the other of the primary memory 18 or the backup memory 24 will be selected. Thus, the signal on line 79 may be thought of as the ultimate output signal of the BUCS Transfer Mechanism 26.

Figure 5:
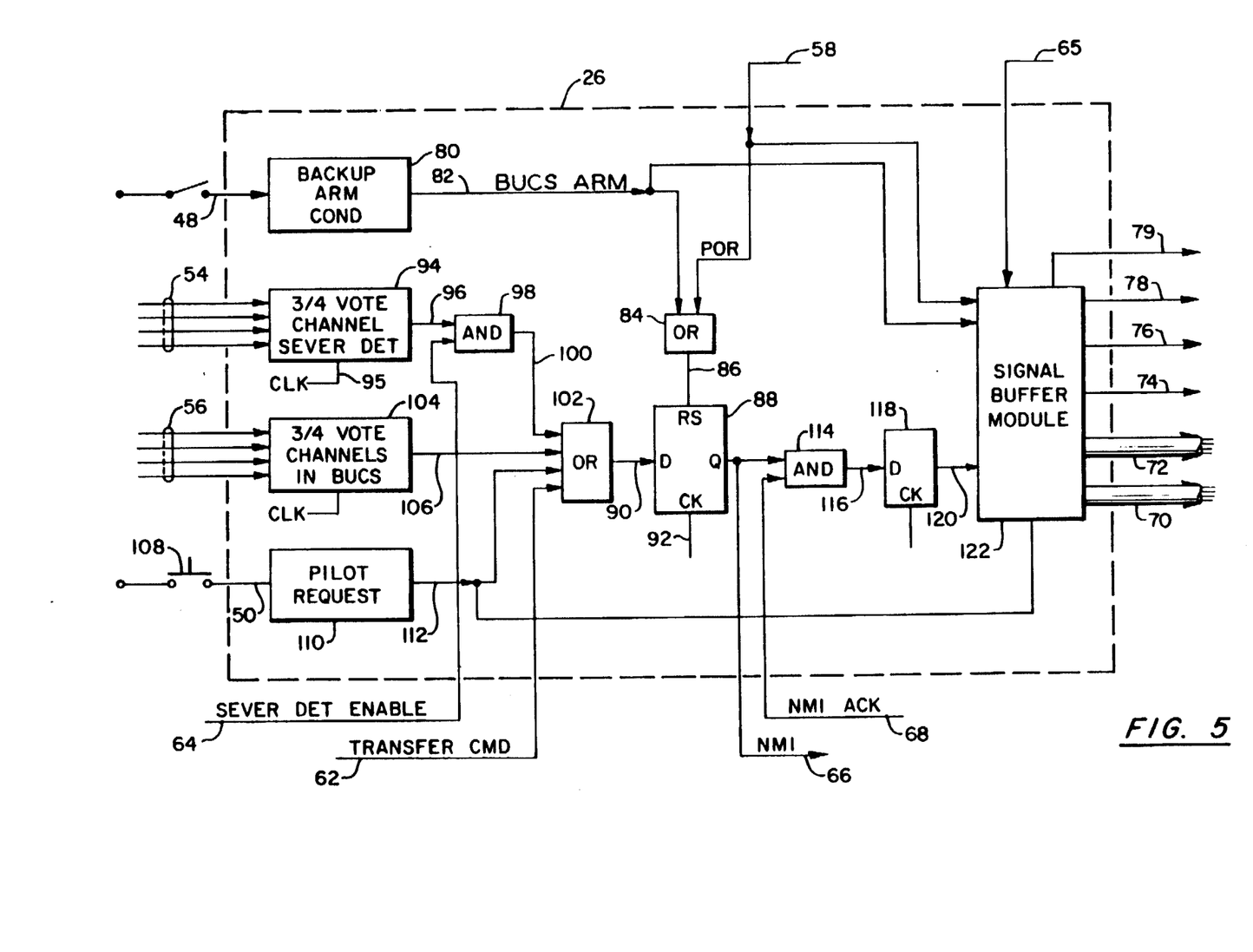
FIG. 5 is a simplified block diagram illustration of a hardware implementation of the Transfer Mechanism of FIG. 4.

FIG. 5 is a illustration of one embodiment of the internals of a BUCS Transfer Mechanism. It will be noted that the embodiment shown in FIG. 5 is a hardware embodiment. However, it will be understood by those skilled in the art, that an embodiment using a signal processor and a program memory designed, for example, in accordance with the flow chart of FIG. 6, could substitute as well. However, it will be undestood that such a program must be independent of both the primary and secondary modes. Hence, the software can't share processing functions or memory functions with either the primary or secondary. For this reasons BUCS is usually more reliable and cost effective as a hardware embodiment. Therefore, FIG. 6 will primarily be useful as an aid to understanding and for illustrating one set of logical steps which might be carried out in implementing the present invention.

In FIG. 5, most of the input signals and output signals shown in FIG. 4 are illustrated. A BUCS Arm signal on line 48 is provided to a Backup Arm Conditioning Circuit 80 which conditions the signal to a level compatible with the input of an OR gate 84 which is responsive to the conditional Backup Arm signal on line 82 and to the POR signal on line 58. In the presence of either of these two asynchronous signals, the OR gate provides a signal on a line 86 to the RS input of a D flip-flop with asynchronous priority over the synchronous inputs. The flip-flop Q output will be high in the presence of a high input signal on a line 90 preceded by a clock signal on a line 92) but will be overridden to produce a low at the Q output in the presence of a high signal on the line 86. This is to prevent a non-maskable interrupt in the absence of the BUCS mechanism being armed or in the presence of POR. A Channel Sever Detector Majority Voter 94 is responsive to a clock signal on a line 95 and to the plurality of channel sever status signals 54 and provides an output signal on a line 96 to an AND gate 98 in the presence of three or more i.e., majority of the four signals 54 for a quad channel system indicating a sever condition. The AND gate 98 is also responsive to a Sever Detect Enable signal on the line 64 from the processor 16 of FIG. 4. Both the signal on the line 96 and the signal on the line 64 must be present before the AND gate 98 will provide an output signal on a line 100 to an OR gate 102.

The plurality of signals indicated by the line 56 of FIG. 4 are provided to a majority voter 104 which provides an output signal on a line 106 to the OR gate 102 if three or more of the channel mode status signals indicate that three or more i.e., majority of channels in quad channel system are in the BUCS mode. In that case, it would be required for the channel in question to also be in the BUCS mode and the signal on line 106 is provided to the OR gate 102 for that purpose, as will be described in more detail below.

The BUCS Engage signal on the line 50 is provided in response to the pilot actuating a switch 108 in the cockpit. A Pilot Request signal conditioner 110 is responsive to the Engage Signal on line 50 and provides a conditioned output signal on a line 112 which is conditioned to be compatible with the OR gate 102, e.g., a signal scaling from a high voltage of 12 VDC to a TTL compatible voltage of 5 VDC.

The OR gate 102 is also responsive to the CPU generated Transfer Command signal on line 62. This signal permits a path for letting the channel join the system or unilaterally making the transfer in case of a generic software failure, as described above.

the D flip-flop 88 provides the Non-Maskable Interrupt signal on the line 66 to the processor 16 of FIG. 4 in the presence of either a majority of the channels in sever, a majority of the channels in BUCS, a pilot request, or a CPU transfer command. Of course, the backup system must be armed before any of these conditions will actually result in a transfer to backup memory, as controlled at the RS input.

Once the Non-Maskable Interrupt signal on the line 66 has been sent to the signal processor, the processor will respond with an NMI Acknowledge signal on the line 68 which is provided, along with the NMI signal itself, to an AND gate 114 which will provide an output signal a line 116 to another D flip-flop 118 only if both the NMI and NMI Acknowledge signals are both present. This ensures that the processor has finished with its present activity before the backup memory is selected.

The D flip-flop 118 will provide an output signal on a line 120 to a Signal Buffer Module 122 which is also responsive to a number of signals including the backup arm signal on line 82, the POR signal on line 58, the pilot request signal on line 112, and the second unsever attempt signal on line 65.

The Signal Buffer Module 122 provides the unsever arm latch signal on line 78, the BUCS armed lamp signal on line 76, the BUCS engage lamp signal on line 74, the channel mode status signals on line 72, the POR status signals on line 70 and, most importantly, the chip select switch signal on line 79.

Although the BUCS Transfer Mechanism of FIG. 4 has been shown in a particular hardware embodiment in FIG. 5, it will be realized that many other hardware embodiments similar to that shown in FIG. 5 are very easily implemented. Such implementations would include various gate arrays and discrete component implementations. It will also be possible to implement the Transfer Mechanism 26 by means of a separate signal processor using a set of instructions similar to those shown in FIG. 6 as long as it is not shared by either the primary or backup software programs resident in memory spaces 18, 24.

Figure 6:
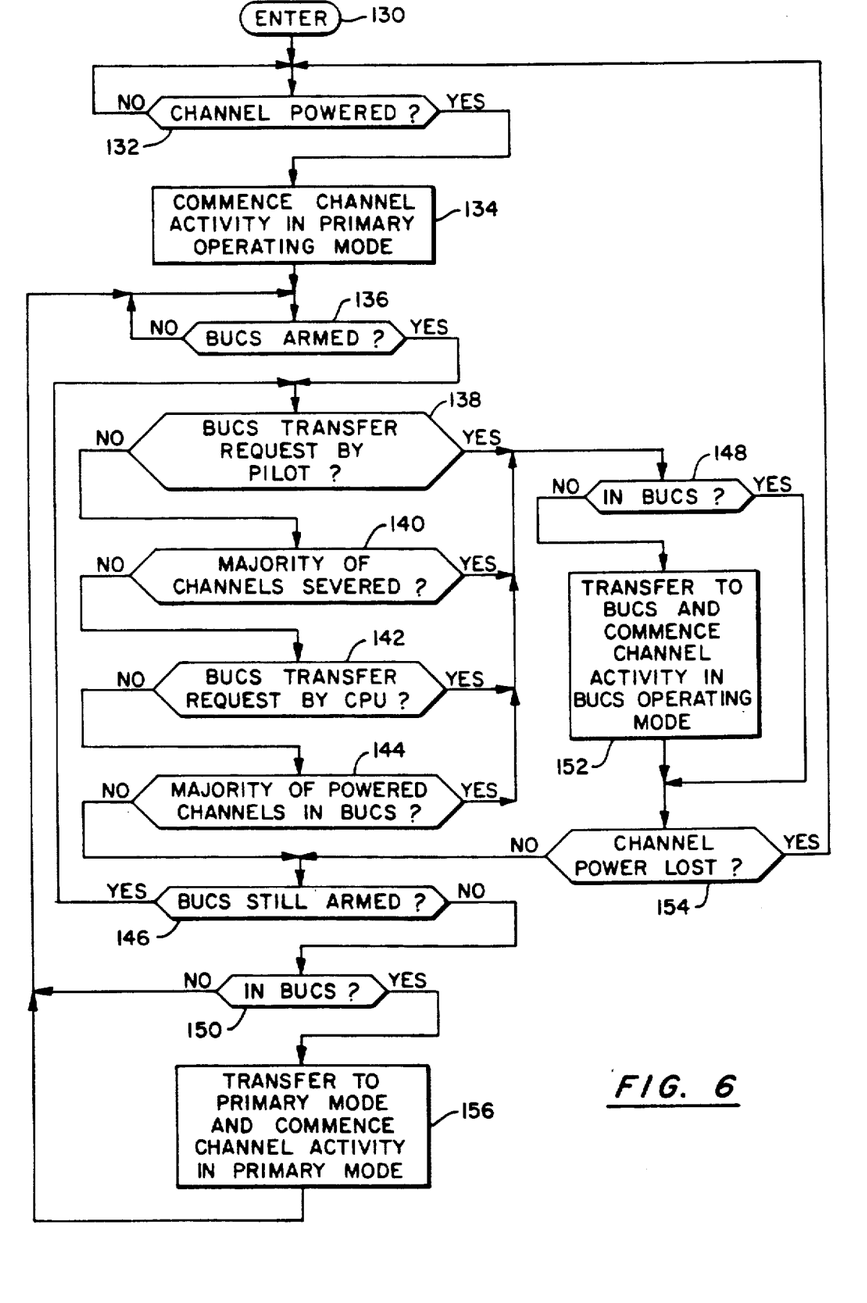
FIG. 6 is a simplified flow chart illustration of the logical steps which would be accomplished by a signal processor implementation of the Transfer Mechanism of FIG. 4.

Thus, the BUCS Transfer Mechanism 26 of FIG. 4 will, for the purposes of FIG. 6, actually be a signal processor including all of the necessary internal components for such a processor including a CPU, a ROM for holding the program steps illustrated in FIG. 6 in permanent memory, a RAM, a data bus, a control bus, an address bus, and all of the other necessary components of a signal processor.

The flow chart illustrating FIG. 6 begins with an enter step 130 after which a step 132 is next executed in which a determination is made as to whether or not the particular channel in which the Transfer Mechanism is located is powered or not. If not, step 132 is continually executed and re-executed until a determination is made that the channel being controlled for transfer is powered. Once this determination is made, a step 134 is next executed in which channel activity is commenced in the primary operating mode. In other words, the primary memory 18 is utilized rather than the backup memory 24.

A step 136 is next executed in which a determination is made as to whether or not BUCS is armed or not. If not, step 136 is continually re-executed until a determination is made that BUCS is in fact armed. Once this determination is made, a step 138 is next executed in which a determination is made as to whether a BUCS transfer request has been made by the pilot, i.e., whether the signal on line 50 of FIG. 5 is present or not. If not, a step 140 is next executed in which a determination is made as to whether or not a majority of the channels are severed or not, i.e., as to whether a majority of the signals on lines 54 are severed or not. If not, a step 142 is next executed in which a determination is made as to whether or not the CPU has made a BUCS transfer request, i.e., whether the signal on line 62 of FIGS. 4 and 5 is present or not. If not, a step 144 is next executed in which a determination is made as to whether or not a majority of the presently powered channels are in BUCS or not. If not, a step 146 is next executed in which a determination is made as to whether or not BUCS is still armed. If so, the steps 138, 140, 142, and 144 are re-executed over and over again until a determination is made by one of the steps 138, 140, 142, 144 that a transfer to BUCS is appropriate as indicated by next executing a step 148 or BUCS is no longer armed, in which case a step 150 is next executed to determine whether or not the channel is using the primary memory 18 or the backup memory 24.

If a determination is made by one of the steps 138-144 that a transfer to BUCS is appropriate, then step 148 is executed to determine whether the channel is already in BUCS or not. If not, a step 152 is executed in which a transfer to BUCS is effected and channel activity is commenced in that mode. If the channel were already in BUCS then step 152 would be unnecessary and a step 154 is directly executed in which a determination is made as to whether or not power has been lost or not in the particular channel. If so, the next step executed would be step 132 in which the program waits until the channel is powered up again and activity is recommenced in the primary mode. If channel power was not lost, then step 146 would next be executed in which a determination is made as to whether or not BUCS is still armed.

If BUCS is not still armed, then a determination is made in step 150 as to whether or not the channel is still in BUCS. If so, a step 156 is next executed in which a transfer to the primary mode is made and channel activity is commenced in that mode. If it were determined in step 150 that the channel is no longer in BUCS then a transfer would be made directly to step 136 instead of executing step 156. In any event, step 136 is next executed after either step 150 or step 156 to determine whether BUCS is armed or not.

The program continues in the above described manner indefinitely and transfers may be made in and out of BUCS as indicated.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A signal processing method for use in each one of a plurality of separately powered channels of a redundant channel system, each channel having primary program memory with resident software for providing a plurality of control function program instructions and for providing system start up function program instructions for the related channel, and dissimilar backup program memory with resident software, different from the resident software in said primary program memory, for providing program instructions for said plurality of control functions for the related channel, comprising the steps of:
   obtaining program instructions from said primary program memory to start up operation of the related channel;
   processing signals under control of the resident software of a selected one of said memories,
   monitoring channel power for an interruption and subsequent reapplication thereof; and
   upon detecting reapplication of power after said interruption, using the primary program memory as a preselected startup memory regardless of the memory used prior to said interruption.

2. Signal processing apparatus (26) for use in each one of a plurality of separately powered channels of a redundant channel system, each channel having primary program memory and dissimilar backup program memory for use in the presence of an indication of a primary program failure common to a majority of the channels, comprising:
   means (58) for providing a channel power-on-reset (POR) signal indicative of either an initial application of channneol power or of an interruption followed by a reapplication of channel power;
   sever voting means (94), responsive to sever status signals (54) from each channel, for providing an interrupt signal (96) in the presence of a majority of the channels indicating a sever status, thereby indicating a program failure common to said majority of channels; and
   means 88, responsive to said interrupt signal 96 from said sever voting means (94) and to said POR signal 58, for normally providing in response to said interrupt signal 96, in the absence of said POR signal 58, a nonmaskable interrupt signal (66) to cause such channel to switch from said primary program memory to said backup program memory, and for not providing said nonmaskable interrupt signal (66) in response to said interrupt signal (96) in the presence of said POR signal (58);
   whereby signal processing always commences using the primary program memory as a preselected startup program memory regardless of the memory used prior thereto.

3. The apparatus of claim 2, further comprising:
   backup voting means (104), responsive to mode status signals (56) from each channel, for providing another interrupt signal (106) in the presence of a majority of the channels indicating the backup program memory is in use; wherein,
   said means (88) for providing said nonmaskable interrupt signal is also responsive to said other interrupt signal (106) from said backup voting means (104) for normally providing in response to said other interrupt signal (106), in the absence of said POR signal (58), said nonmaskable interrupt signal (66), and for not providing said nonmaskable interrupt signal (66) in response to said other interrupt signal (106) in the presence of said POR signal.

4. A signal processing method for use in each one of a plurality of separately powered channels of a redundant channel system, each channel having primary program memory with resident software for providing a plurality of control function program instructions and for providing system startup function program instructions for the related channel, and dissimilar backup program memory with resident software, different from the resident software in said primary program memory, for providing program instructions for said plurality of control functions for the related channel, comprising the steps of:
   obtaining program instructions from said primary program memory to start up operation of the related channel;
   processing signals under control of the resident software of said primary program memory;
   selectively providing an arm signal indicative by its presence that transferring from use of primary program memory to use of backup program memory is to be permitted and indicative by its absence that such transferring is not to be permitted;
   testing, in response to the presence of said arm signal, for the presence of fault signals indicative of incorrect operation in one or more of the channels;

providing an interrupt signal, in the presence of a majority of the channels providing fault signals indicative of incorrect opertion;

permitting the signal processor to complete its present operation in response to said interrupt signal and then suspending further signal processing steps until commencing to obtain program instructions from the backup program memory;

providing a suspend acknowledge signal in the presence of the signal processor suspending the execution of further steps;

ceasing to obtain program instructions for the signal processor from the primary program memory in response to said suspend acknowledge signal;

commencing, after said ceasing, to obtain program instructions for the signal processor from the backup program memory;

checking for the continuing presence of said arm signal and transferring the signal processor to primary program memory upon detecting the absence of said arm signal regardless, until said arm signal is redetected, of the subsequent presence of fault signals in a majority of channels indicative of incorrect primary program execution therein;

monitoring channel power for an interruption and subsequent reapplication thereof; and upon detecting reapplication of power after said interruption, using the primary program memory as a preselected startup memory regardless of the memory used prior to said interruption.

5. The method of claim 4, further comprising the step of:

preventing the obtaining of further instructions from the primary program memory after commencing to obtain instructions from the backup program memory except after said arm signal is detected as having been removed or after a power interruption.

* * * * *